United States Patent [19]

Pendergast et al.

[11] 3,885,761
[45] May 27, 1975

[54] AIRCRAFT EMERGENCY EGRESS SYSTEM

[75] Inventors: Daniel O. Pendergast; William T. Engel, both of Arlington; Vernon R. Dorrough, Grapeville, all of Tex.

[73] Assignee: Jet Research Center, Arlington, Tex.

[22] Filed: Mar. 5, 1974

[21] Appl. No.: 448,324

[52] U.S. Cl. .................................. 244/121; 89/1 B
[51] Int. Cl. .............................................. B64c 1/32
[58] Field of Search . 244/121, 122, 122 R, 122 AF; 89/1 B; 74/502, 501 R, 471 R

[56] References Cited
UNITED STATES PATENTS

| | | | |
|---|---|---|---|
| 1,390,040 | 9/1921 | Keesey | 74/502 |
| 2,394,425 | 2/1946 | Martin | 244/121 |
| 2,873,648 | 2/1959 | Musser et al. | 89/1 B |
| 2,937,829 | 5/1960 | Martin | 244/121 |
| 2,986,362 | 5/1961 | Gimalouski | 74/501 X |
| 3,312,430 | 4/1967 | Martin | 244/122 A |
| 3,356,025 | 12/1967 | Duncan | 89/1 B X |
| 3,416,390 | 12/1968 | Houk | 74/502 X |
| 3,417,947 | 12/1968 | Valentine | 244/122 R |
| 3,778,010 | 12/1973 | Potts et al. | 244/121 |

*Primary Examiner*—Trygve M. Blix
*Assistant Examiner*—Paul E. Sauberer
*Attorney, Agent, or Firm*—Thomas R. Weaver; William R. Laney; John H. Tregoning

[57] ABSTRACT

A system for enabling rapid escape from an aircraft under emergency conditions comprising an explosive closure cutting assembly, an explosive initiator assembly in immediate proximity to said explosive closure cutting assembly, a manually actuated firing handle and a remote control mechanical actuating linkage having one end operatively connected to the explosive initiator assembly and the other end connected to the manually actuated firing handle.

22 Claims, 5 Drawing Figures

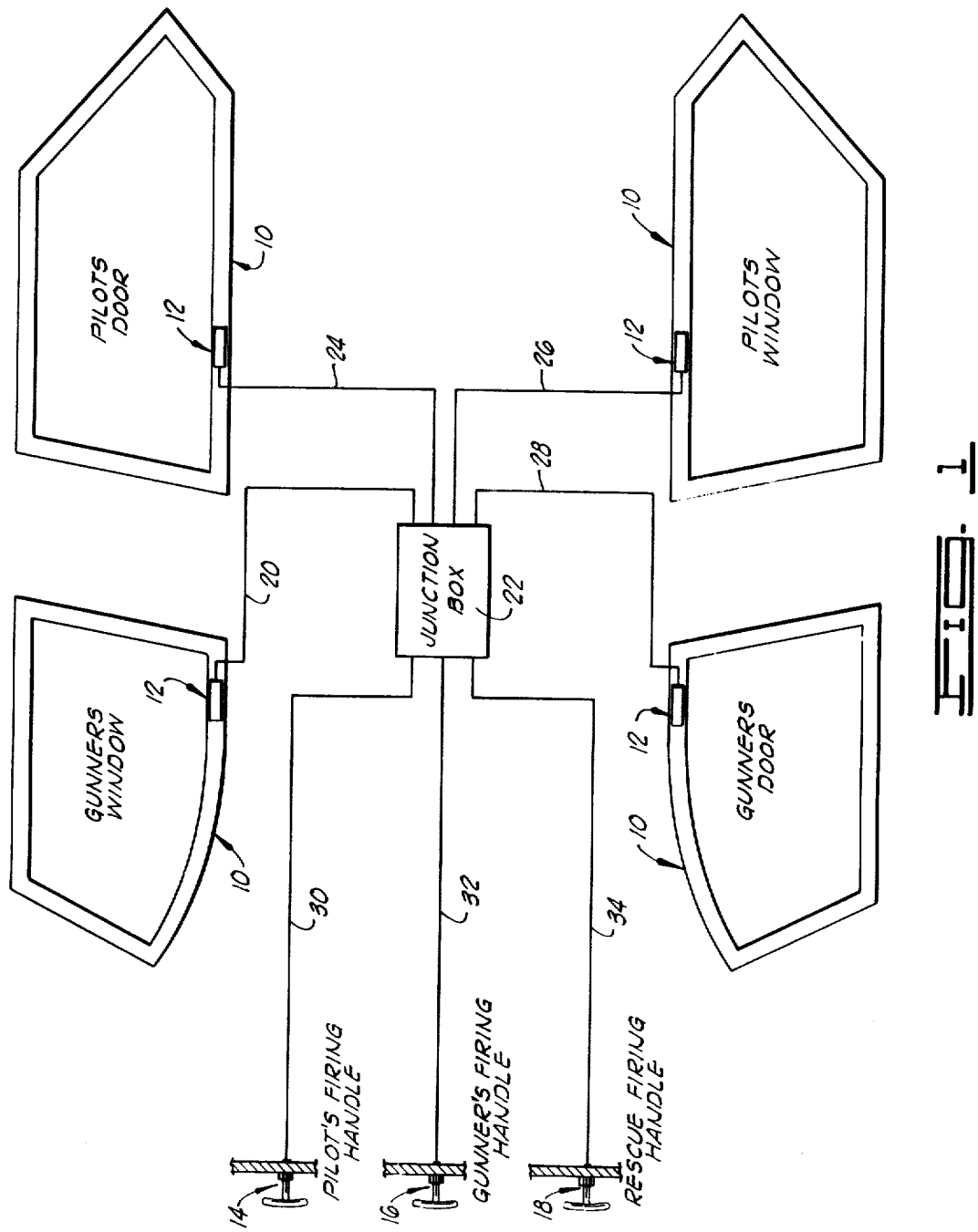

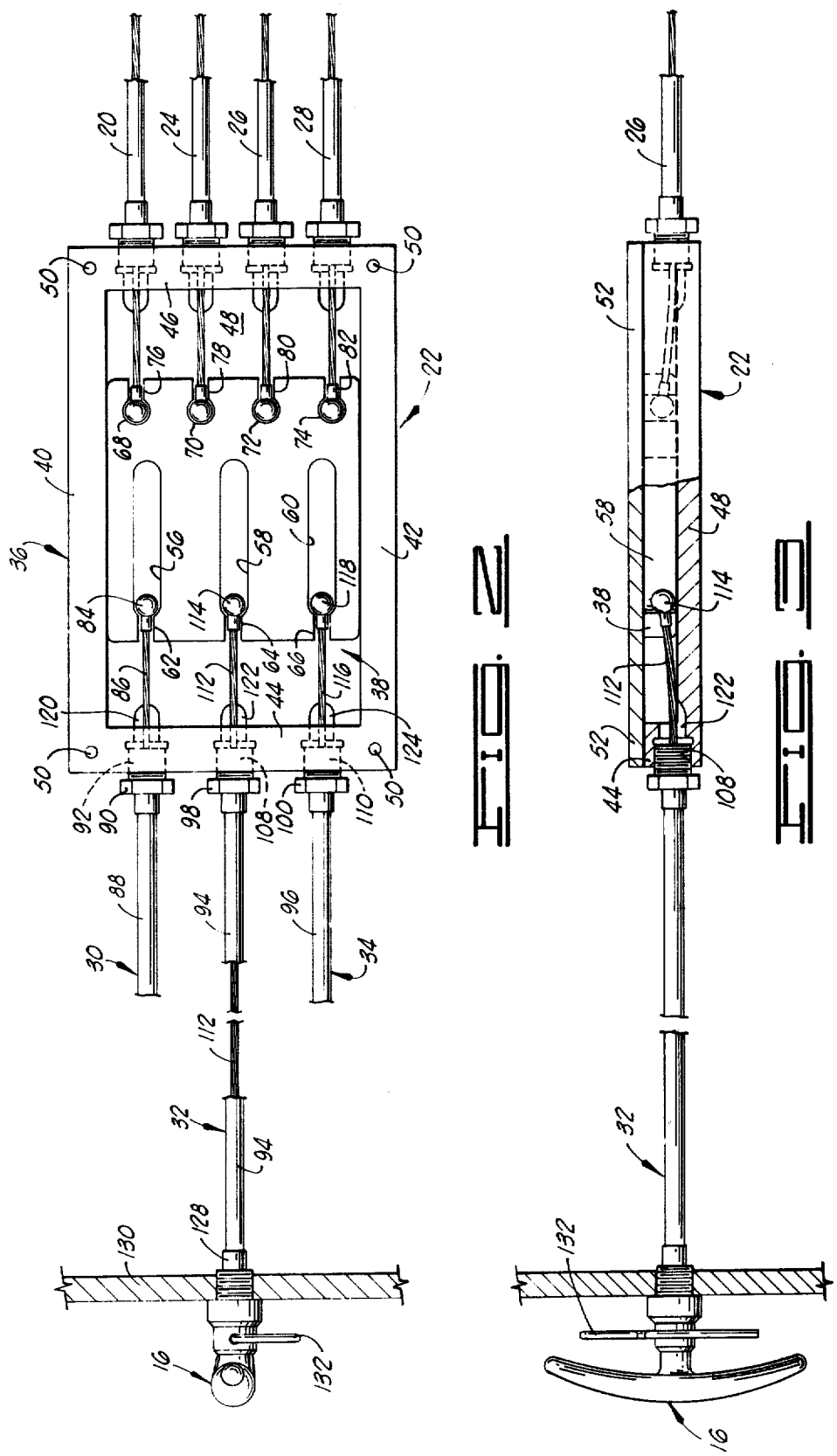

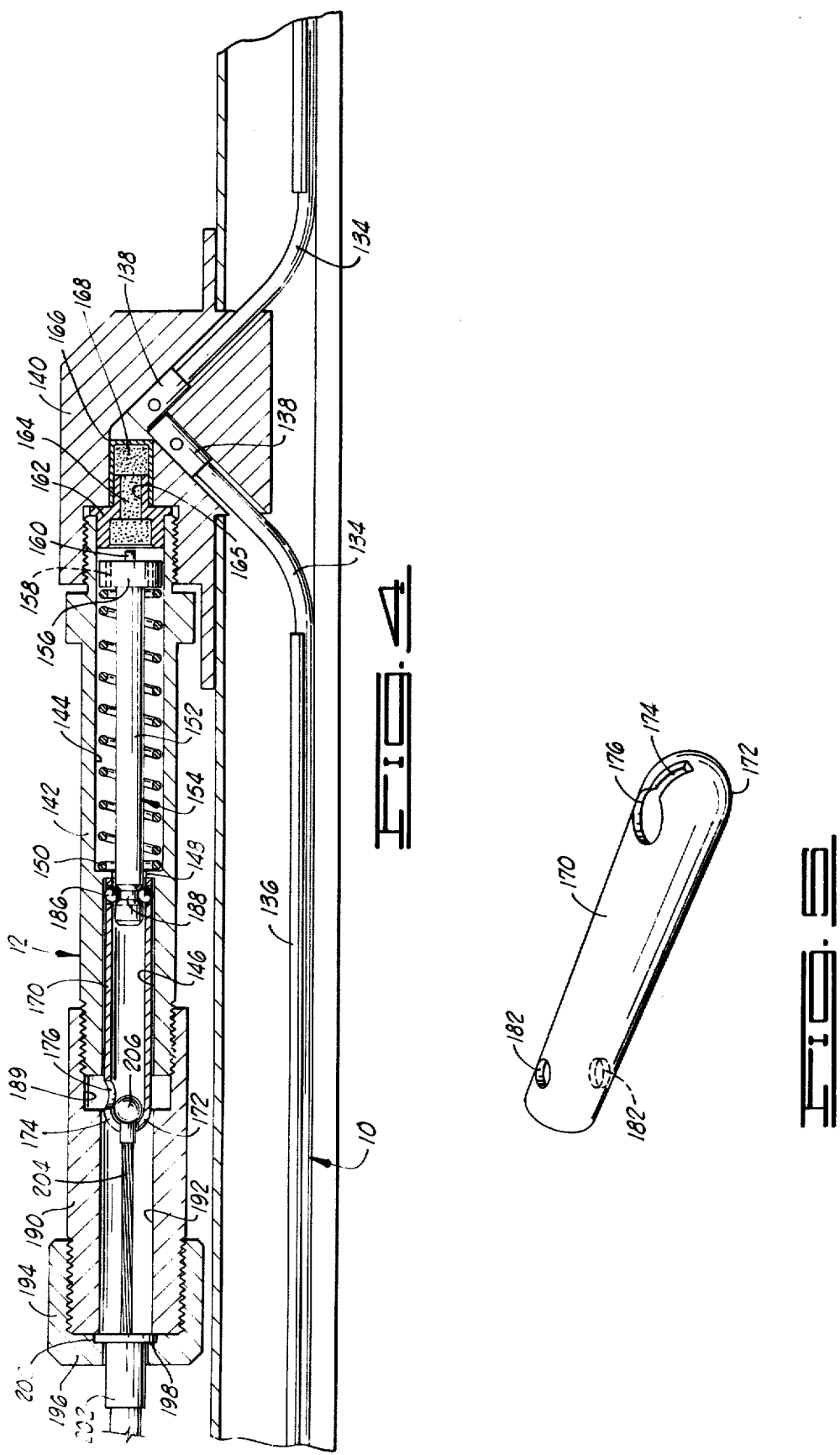

3,885,761

AIRCRAFT EMERGENCY EGRESS SYSTEM

BACKGROUND OF THE INVENTION

1. Field of the Invention

This invention relates to vehicle emergency egress systems, and more particularly, to systems facilitating rapid escape from the interior of aircraft under emergency conditions and employing localized explosives in minimal quantities for substantially instantaneously forming an opening in the aircraft facilitating egress therefrom.

2. Brief Description of the Prior Art

The need for a reliable emergency egress system facilitating the safe and rapid escape of crew members from a damaged or crashed aircraft is well known. For many years, provision has been made for quickly removing the windows, doors, canopies, or all of these, from combat aircraft of all types when such aircraft become disabled or critically damaged so as to endanger the lives of crew members operating the craft. Many of the systems provided for this purpose have used shaped explosive charges to explosively cut such part of the structure surrounding a door, canopy or window as will allow these closure elements to fall, or to be ejected, away from the aircraft. One or all of the occupants of the craft can then escape through the opening thus formed, either under their own motive power, or through the actuation of some type of catapulting device which hurls the body of the escapee through the explosively formed opening.

Several types of systems have been previously proposed for explosively providing emergency egress routes for rapid escape from imperiled aircraft. In some systems, a single escape opening is developed by explosively cutting away a canopy or door of the craft using shaped charges disposed at specific locations around the respective canopy or door. These charges have been detonated, upon occasions of use, in various ways, including the use of electrical circuitry operated as an auxiliary system deriving its power from the power plant of the aircraft, and the use of an explosive train extending from a remote control location which may be adjacent one or more of the crew members, and providing an energy transfer train by which the detonating action is initiated at the remote control location and proceeds through the explosive train to the point adjacent the shaped charges where actual detonation thereof is to occur.

Systems of the type described are commonly characterized by the disadvantage arising in some emergency situations, and particularly in certain critical combat emergencies, that the single egress route or escape opening thus provided is inadequate to facilitate the safe escape of occupants of the aircraft. This may be due to the aircraft crashing in such a way that one side where the opening is to be formed is blocked by the ground, the development of a conflagration within or outside the aircraft adjacent the opening creating a substantial hazard to the escapees attempting to escape through the opening thus formed, or other factors diminishing the adequacy of the means of escape thus provided. Further, in those systems which depend upon electrical power derived from the power plant of the aircraft, certain emergency conditions giving rise to the need for escape from the interior of the craft may have also destroyed or seriously impaired the functioning of the craft's power plant, and thus also disabled the emergency egress system.

Where explosive trains have been used for transmitting remotely instituted actuating energy to the explosive cutting charges employed to develop the escape opening, the risk is always present that these trains may be undesirably actuated, or the explosive material therein ignited as a result of weapons fire directed against the aircraft by enemy aircraft. The resulting actuation of the emergency egress system, in resulting in a large opening being formed in a part of the aircraft fuselage, may seriously impair the extended fighting capability of the aircraft, and may endanger the occupants or crew of the craft, all at a time when there otherwise is no particular need for emergency escape from the craft, or utilization of the emergency egress system. Further, the use of such explosive trains is expensive and is difficult to maintain over extended periods of time in a reliable state due to the propensity of the explosive compositions used in such trains to deteriorate or become relatvely inert over extended periods of time, and the need in such explosive trains to provide a number of explosive interfaces each representing points with a significant potential for operational failure. Repeated surveilance and maintenance of such trains is dictated by their inherent extended life fallibility.

Recognizing the limited usefulness of systems of the type which effectively provide but a single opening or route of escape from the interior of the aircraft, other systems which have been proposed have contemplated the concurrent development of several escape openings at different locations in the fuselage of the aircraft. Thus, in some helicopter escape systems, the simultaneous or concurrent removal of windows and doors positioned at spaced locations on the fuselage of the helicopter, using explosive cutting charges, has been proposed. In other instances, provision is made for the removal of several or all of the windows and doors of the craft, but such removal is effected under the local control of each crew member or occupant of the craft who is nearest to the particular closure structure to be removed. A disadvantage may, of course, here result if that particular crew member or occupant has been injured or killed by the circumstances creating the emergency requiring escape, in that the escape route which would otherwise be provided upon the actuation of the system by the injured or incapacitated individual is not available for use by other occupants. Further, the multiple opening systems described multiply the risk and danger which has been described as characteristic of those systems which utilize explosive trains for actuation, since these systems require much more extensive explosive trains extending through many parts of the aircraft, and are thus more susceptible to unintentional energization or actuation by fire from enemy craft, or other unintended circumstances. Moreover, in multiple opening systems of the type described, provision of explosive trains for actuating systems greatly increases the need for repeated surveillance and maintenance in order to attain the required assurance that all of the several sub-parts of such multiple openings system will function properly in an emergency situation.

BRIEF DESCRIPTION OF THE PRESENT INVENTION

This invention is an emergency egress system which is simple, reliable, easily maintained and relatively safe in use, and in these respects affords significant advantage over the types of structures and systems previously offered and used to facilitate the escape of the occupants of aircraft in emergency situations. The emergency egress system of the invention includes some subcomponents and assemblies which have, per se, been used in other long known systems for developing structural openings in aircraft or various rigid structures, but the egress system as whole is assembled, and its various components made to cooperate, in a novel way which assures maximum reliability and minimum danger of inadvertent of premature actuation. Moreover, the system requires little maintenance, and is characterized by a substantially enhanced and extended trouble-free operating life as compared to many of the egress systems previously used — particularly those which include extensive explosive trains projected between locations in the aircraft.

Broadly described, the emergency egress system of the invention comprises four major assemblies. These include (a) an explosive closure cutting assembly which, when detonated, explosively cuts away sufficient structure adjacent a window, door hatch or like closure, to free ther closure from the air-craft fuselage, and develops an open escape route; (b) an explosive initiator assembly positioned adjacent the cutting assembly and functioning to detonate explosive charges in the cutting assembly; (c) a manually actuated firing handle; and (d) a remote control mechanical actuating linkage which extends between the explosive initiator assembly and the firing handle and facilitates mechanical transmission of the firing handle movement to the explosive initiator assembly.

In a preferred embodiment of the invention, a plurality of the described major assemblies is provided, and these assemblies are interconnected so that a number of escape openings can be concurrently produced by actuation from one or more remote locations. In the preferred embodiment, the several explosive initiator systems provided for each opening to be formed by the closure cutting assemblies are connected by an equivalent number of mechanical actuating linkages to a junction box. Mechanical actuating linkages are also extended from the junction box to each of several mechanically actuated firing handles located at various crew stations, and the junction box facilitates concurrent actuating movement of the linkages to the several explosive initiator systems when any one of the firing handles is moved to a firing status.

From the foregoing description, it will be apparent that it is an important object of the invention to provide a reliable and mechanically simple emergency egress system for incorporation in aircraft to develope emergency openings in the aircraft through which operating personnel may escape.

An additional object of the invention is to provide an emergency egress system which requires relatively little maintenance and is characterized in having a lengthy, trouble-free operating life.

An additional object of the invention is to provide an emergency egress system which is particularly useful in helicopters for simultaneously providing a plurality of explosively developed openings at spaced locations in the helicopter by actuation initiated at any one of several crew stations.

Additional objects and advantages of the invention will become apparent as the following detailed description of the invention is read in conjunction with the accompanying drawings which illustrate a preferred embodiment of the invention.

BRIEF DESCRIPTION OF THE DRAWINGS

FIG. 1 is a schematic illustration of the aircraft emergency egress system illustrating an embodiment of the system as it might be provided in a helicopter.

FIG. 2 is a plan view illustrating a portion of a junction box and Bowden cable system used in conjunction with a manually manipulatable firing handle all employed in the egress system of the invention.

FIG. 3 is a side elevation view of the junction box depicted in FIG. 2 with the top plate secured thereon, and further showing the manually manipulatable firing handle used in the egress system as such handle appears in side elevation.

FIG. 4 is a longitudinal sectional view taken through the center of an explosive initiator system, and illustrating parts of an explosive closure cutting assembly forming a portion of the egress system of the invention.

FIG. 5 is a perspective view of the tubular sleeve used in the firing pin mechanism employed in the egress system.

DETAILED DESCRIPTION OF A PREFERRED EMBODIMENT OF THE INVENTION

The aircraft emergency egress system of the invention is schematically illustrated in FIG. 1. As previously described, the system in its most basic form includes four major assemblies. These are an explosive closure cutting assembly, and explosive initiator assembly, a remote control actuating linkage and a manually actuated firing handle. FIG. 1, in depicting a preferred embodiment of the invention, illustrates a plurality of the several described assemblies. Thus, four of the explosive closure cutting assemblies, each designated generally by reference numeral 10, are provided and extend generally around the gunner's window, gunner's door, pilot's door and the pilot's window. For the purpose of detonating the explosive charges in the cutting assemblies 10 in a manner hereinafter described, four of the explosive initiator assemblies 12 are provided and are located in close proximity to the explosive closure cutting assemblies. Three of the manually actuated firing handles are used in the illustrated system, and include a pilot's firing handle 14, disposed at the pilot's action station, a gunner's firing handle 16, located at the gunner's action station, and a rescue firing handle 18, provided at a location which is most apt to be accessible to a rescue party who may wish to quickly gain entrance to the interior of a crashed helicopter in order to extricate seriously injured crew members.

Extending between the explosive initiator assemblies 12 and the manually actuated firing handles 14, 16 and 18 are a plurality of remote control mechanical actuating linkages. In the depicted embodiment of the invention, one of the remote control mechanical actuating linkages 20 extends from the explosive initiator assembly 12 at the gunner's window to a junction box 22. A second actuating linkage 24 extends between the junction box 22 an the explosive initiator assembly 12 adjacent to the pilot's door. Other actuating linkages 26 and 28 extend from the explosive initiator assemblies 12 adjacent the pilot's window and gunner's door, respectively, to the junction box. Three mechanical actuating linkages 30, 32 and 34 extend from the three manually actuated firing handles 14, 16 and 18, respectively, to the junction box. The generally described system facilitates the concurrent explosive cutting of four escape openings at the local of the gunner's door and window and the pilot's door and window by independent control which can be exercised at any of three locations by manually actuating the firing handle at either the pilot's station, the gunner's station or at the rescue station.

FIG. 2 of the drawings illustrates in detail the construction of the junction box 22, the remote control mechanical actuating linkages and one of the firing handles. The junction box 22 includes a housing 36, which is of generally right parallelepiped configuration and hollow, and a slider block, designated generally by reference numeral 38, which block is also of right parallelepiped overall configuration and is slidably mounted in the housing 36. The housing 36 includes a pair of opposed side walls 40 and 42 which are interconnected by a pair of end walls 44 and 46. The housing also includes a bottom wall 48 having a top surface which is spaced downwardly from the upper edges of the side walls and end walls of the housing so as to provide a hollow interior. At the corners of the housing 36, holes 50 for the reception of screws or other suitable fasteners are provided so that a flat cover plate 52 can be secured to the housing to close the upper side thereof as illustrated in FIG. 3.

The slide block 38 is positioned in the housing 36 is dimensioned so that a pair of opposite sides thereof bear against the side walls 40 and 42 of the housing, and the block is of a thickness such that very little space exists between the top surface of the slider block and the inner surface of the cover plate 52. It will be noted in referring to FIG. 2 that the corners of the slider block 38 are radiused to avoid binding of the block against the housing 36 during its sliding movement therein, as hereinafter described. The slider block 38 is formed therein, three elongated, substantially parallel ball slots 56, 58 and 60 with such slots extending completely through the slider block and intersecting coaxially extending wire channels 62, 64 and 66 which open at one side of the slider block which faces the end wall 44 of the housing 36. At the opposite side of the slider block 38, a plurality of ball apertures 68, 70, 72, and 74 are provided which extend through the slider block 38 from the top to the bottom thereof, and which intersect wire channels 76, 78, 80 and 82, respectively.

The slider block, as thus constructed, is adapted for the connection thereto of the ends of the movable core wire portions of Bowden cables constituting a preferred form of the remote control mechanical actuating linkages provided in the egress system of the invention. To facilitate such connection, a ball or spherical member is provided on the end of each core wire which is to be connected or secured to the slider block 38. Thus, a sperical member or ball 84 is secured to an end of a core wire 86 forming a part of the Bowden cable constituting the mechanical actuating linkage 30 which extends to the pilot's firing handle 14. The surrounding flexible sheath portion 88 of this Bowden cable is secured by means of a suitable threaded fitting 90 to the end wall 44 of the housing 40 by threaded engagement of the fitting with a threaded aperture 92 formed in such end wall. In similar fashion, the mechanical actuating linkages 32 and 34 to the gunner's firing handle 16 and the rescue team firing handle 18, respectively, are Bowden cables including external sheaths 94 and 96 which are secured by threaded fittings 98 and 100 to the end wall 44 by engagement of these fittings with the threaded bores 108 and 110, respectively. A core wire 112 extends from the sheath 94 into the housing 36 and carries at its end a ball 114 positioned in the slot 58 in the slider block 38. Similarly, a core wire 116 extends from the sheath 96 to the interior of the housing and carries a ball 118 positioned in the slot 60. Suitable shaped apertures 120, 122 and 124 are formed in the housing 36 in communication with the threaded bores 92, 108 and 110 to accommodate extension of the core wires through the end wall 44 to the interior of the housing.

Since the remote control mechanical actuating linkages 20, 24, 26 and 28 are constructed identically to the actuating linkages 30, 32 and 34, and are of the conventional Bowden cable construction, it is unnecessary to provide a specific description of the several structural elements making up these linkages. It will also be apparent in referring to FIGS. 2 and 3 that the use of threaded fittings for securement of the sheath portions of these linkages to the end wall 46 of the housing 40 is the same as that which has been described as characteristic of the fittings 90, 98 and 100 forming part of the actuating linkages 30, 32 and 34, respectively.

The configuration and general location of the manually actuated firing handles 14, 16 and 18 may be better understood by reference to the more detailed illustration of the firing handle 16 in FIGS. 2 and 3 of the drawings. The firing handle utilized in a preferred embodiment of the invention is a standard handle presently used with push-pull blocking and releasing controls, and characterized in having a two-step action which requires a 90° turn of the handle from the position depicted in FIGS. 2 and 3 in order to release a locking element (not shown), and to permit the handle to be pulled in a direction parallel to the axis of the actuating linkage 32, and away from the junction box 22. The handle 16 is connected through a suitable ball terminal to the core wire 112 within the sheath 94 so that when the handle is rotated 90 degrees, and then pulled, the core wire is caused to slide in the sheath. Such sliding, reciprocating motion of the core wire effectively pulls the slider block 38 in a reciprocating movement within the housing 36. The sheath 94 itself is anchored by a suitable fitting 128 in a rigid panel 130 or other suitable stationary structure within the aircraft, and by the fitting 98 secured to the junction box housing 36.

From the description of the firing handle 16, it will be perceived that the firing handle, when disposed in the position depicted in FIGS. 2 and 3, is in the "safe" position, since the handle cannot be pulled at this time to cause the core wire 112 to slide within the sheath 94, and thus moves the slide block 38 within the housing 36. When the handle is rotated 90 degrees so that it is then free to initiate the pulling action, it is in the "armed" position. When the handle is pulled subsequently to this time, the explosive initiator assemblies will be actuated in a manner hereinafter described. Each of the firing handles 14, 16 and 18 is characterized by the structure and actuation sequence which has been described in referring to the firing handle 16 shown in FIGS. 2 and 3. Each of the firing handles 14, 16 and 18 can be locked in the "safe" position by means of a firing pin 132 extended through aligned apertures in the hub and rotating shaft portions of the firing handle structures. When such safety pin 132 is pulled, the firing handles can be rotated from their "safe" to their "armed" positions.

The details of construction of one of the identical explosive initiator assemblies 12 utilized in the emergency egress system are illustrated in FIG. 4, as are certain parts of the explosive closure cutting assembly 10. Before describing the explosive initiator assembly 12, it is pointed out that each explosive closure cutting assembly forming a part of the illustrated embodiment of the egress system of the ianvention is a conventional assembly presently used in some types of emergency egress systems, and functioning to explosively cut the metallic structure surounding a window, door, canopy, hatch or other closure provided in an aircraft fuselage.

Such explosive closure cutting assemblies generally include an elongated train or line of a shaped cutting charge 134 which may typically be, for example, hexanitrostilbene. Though less preferred, pentarithritol tetranitrate and trimethylene trinitramine are examples of other usable cuttng charges. The cutting charge 134 is extended along a line which outlines and surrounds that portion of the fuselage structure which is to be cut away to provide an egress opening. Its cutting effect is aided by a rigid directional back-up shield 136 which channels and directs the force of the explosion occuring upon detonation of the cutting charge so that the structural element to be cut is severed cleanly along the desired line of cutting, and the force of the charge is not dissipated in other directions. At the terminus of the trains of the cutting charge 134, acceptor booster charges 138 are provided, and function in a manner well understood in the art to initiate detonation of the cutting charges. The explosive material used in the acceptor boosters can also be one of the types used in the cutting charges. A final element of the explosive closure cutting assembly is a receptor housing 140 which is mounted in any suitable way to the fuselage or other rigid structure adjacent the particular window, door, or other closure to be removed, and functions to permit the respective explosive initiator assembly 12, which is to be positioned adjacent, and used to actuate, the cutting assembly 10, to be mounted in its operative position.

Each explosive initiator assembly 12 includes a firing pin housing 142. The firing pin housing 142 includes a relatively large bore 144 extending into the housing from one end thereof and a relatively small counterbore 146 extending into the housing from the opposite end thereof. An internal annular flange 148 is provided as an internal partition between the bore 144 and the counterbore 146, and functions as an abuttment or stop for one end of a compression spring 150 which is positioned in the bore 144. The compression spring 150 is positioned with its convolutions concentrically surrounding an elongated shaft 152 which forms a part of a firing pin designated generally by reference numeral 154. The firing pin 154 carries near one of its ends, an annular hub 156 which is of a slightly lesser diameter than the bore 144 and is positioned to abut the second end of the compression spring 150. The hub 156 has one or more small orifices 158 formed therethrough to avoid entrapment of air ahead of the firing pin during its firing stroke as hereinafter explained. Positioned on the opposite side of the hub 156 from the firing pin shaft 152 is a small protuberant contact point 160 of the firing pin.

At its end adjacent the hub 156 of the firing pin, the firing pin housing 142 is externally threaded to permit it to be threaded into a threaded bore formed in the receptor housing 140. Fitted into this threaded end of the firing pin housing 142 is an initiator body 162. The initiator body 162 is flanged to facilitate retainment between the firing pin housing 142 and the receptor housing 140, and has a relatively large bore in the side thereof adjacent the firing pin 154. A percussion primer charge 164 is positioned in this bore and in a small counterbore 165 communicating therewith. The primer charge can be, for example, lead azide, although other materials can also be utilized. Contained within a small cap 166 which is pressed over an end of the initiator body 162 is a donor booster charge 168 which can suitable by for example, trimethylene trinitramine or hexanitrostilbene.

Slidably mounted within the counterbore 146 in the firing pin housing 142 is an elongated tubular sleeve 170. The sleeve 170 projects out of the open end of the firing pin housing 142, and is closed by a rounded end portion 172. A radially extended slot 174 is formed in the rounded end portion 172 of the sleeve 170 and communicates with a relatively large round opening 176 formed in one side of the portion of the sleeve 170 which extends out of the firing pin housing 142. Adjacent the open internal end of the sleeve 170, a pair of openings 182 extend through the sleeve (see FIG. 5). The openings 182 accommodate a pair of balls 186. The balls 186 are positioned in the openings 182 with a portion of the spherical periphery of each ball projecting into an annular groove 188 which extends around an end portion of the firing pin shaft 152. It will be noted that the balls 186 are retained in this location (in the status of the explosive initiator 12 depicted in FIG. 4) by contact of the balls with the wall of the counterbore 146. It should also be noted that the annular groove 188 formed in the firing pin shaft 152 has tapered or chamfered sides, and the purpose of this geometry will be understood from the subsequent description of the operation of the invention.

The end of the firing pin housing 142 from which the sleeve 170 projects is threaded part of the way into an internally threaded bore 189 formed in one end of a connector block 190. The connector block 190 is provided with a counterbore 192 which is dimensioned to slidingly receive the sleeve 170 during the operation of the firing pin mechanism as hereinafter described. The end of the connector block 190 opposite its end which carries the bore 189 is externally threaded to facilitate the securement thereto of a cable anchor collar 194. The cable anchor collar 194 includes a base plate 196 which is centrally apertured with an opening configured to provide a shoulder 198. The shoulder 198 functions as a stop to retain an annular flange 200 forming a part of an anchoring ferrule 202 secured to one end of the flexible Bowden cable sheath used in the mechanical actuating linkage 20. The core wire 204 of this cable projects axially in the counterbore 192 of the connector block 190, and terminates in a ball 206 which is releasably connected to the end portion 172 of the sleeve 170. It will be noted that the ball may be easily connected to the sleeve 170 by inserting the ball and core wire 204 through the opening 176 and slot 174 provided in the end portion 172 of the sleeve.

OPERATION

In the operation of the illustrated embodiment of the invention, multiple emergency openings can be explosively formed in the fuselage of a helicopter or other aircraft by remote actuation at any one of several firing locations. Thus, in the event of an emergency requiring rapid escape from the helicopter, the pilot or the gunner, by rotating their respective firing handles, 14 or 16, to the "armed" position and then pulling the firing handle, can cause all of the four explosive initiator assemblies 12 to be actuated, and by such actuation, to detonate the four explosive cutting assemblies 10. The result will be that the gunner's window, pilot's door, gunner's door and pilot's window are all cut away and blown free of the helicopter so that the crew can escape through any of these openings. The firing station constituted by the rescue station firing handle 18 can also, in certain emergency situations, be used by any one of the crew should shell fire sever or disable the mechanical actuating linkages 30 and 32, and leave intact only the mechanical actuating linkage 34.

The sequence of actuation and explosive detonation which occurs to accomplish the described results includes, initially, the removal of one or more of the firing pins 132 which lock the firing handles 14, 16 and 18 in their inoperative or "safe" positions. The firing handle from which the firing pin 132 is removed can then be rotated 90° to its "armed" position. There may, of course, be occasions in combat situations where one or more of the crew members desire to place their respective firing handles in this position, and still not complete the firing sequence until a more perilous or clearly disastrous situation becomes imminent.

When the decision is reached to use the emergency egress system for developing the described escape openings, one or more of the crew members then actuates the system by pulling the respective firing handle so that the core wire in the Bowden cable constituting the respective mechanical actuating linkage is reciprocated within its sheath. This action causes the slider block 38 to slide toward the end wall 44 within the housing 36 of the junction box 22. It should be noted that this actuation of the system by the use of a single firing handle is not opposed or interfered with by the static status of the other firing handles and their related mechanical actuating linkages, since the balls 84, 114 and 118 positioned in the elongated slots 56, 58 and 60 are each free to slide from one end of the respective slot to the other, and in this manner, the sliding movement of the slider block 38 can be accommodated by the passive linkages.

As the slider block 38 commences its sliding movement within the housing 36 toward the end wall 44, the core wires of all of the mechanical actuating linkages 20, 24, 26 and 28 are pulled as a result of their securement to the opposite side of the slider block from the core wires 86, 112 and 116. This movement of the core wires forming the parts of the actuating linkages 20, 24, 26 and 28 in turn results in the respective sleeves 170 connected to opposite ends of these several core wires being reciprocated into the connector block counterbores 192 in the respective explosive initiator assemblies 12.

The balls 186 carried in the openings 182 in each sleeve 170 form, at this time, an interlock between the respective sleeve and the shaft 152 of the firing pin 154. Thus, each firing pin 154 moves with its sleeve 170, and in undergoing such movement, compresses the spring 150. At a time during this movement when the balls 186 are moved past the end of the firing pin housing 142 which is positioned within the bore 189 of the connector block 190, the balls are free to fall radially outwardly into the accommodating space provided by the bore in the connector block. The balls 186 will, in fact, be forceably ejected into this space by the chamber forming a side wall of the groove 188 in the firing pin shaft 152, since a force acting to drive the firing pin in the opposite direction from the direction of movement of the sleeve 170 has been developed at this time by the compression of the spring 150. As the balls 186 move outwardly into the space provided by the bore 189, the firing pin is freed from its engagement with the sleeve 170 and expansion of the spring 150 drives the firing pin forceably toward the percussion primer charge 164. At the end of the stroke of the firing pin 154, the contact pin 160 strikes and detonates the percussion primer charge 164, which in turn detonates the donor booster and acceptor booster charges. The detonation of these charges in turn causes detonation of the shaped cutting charges 134 with the result that the four openings adjacent the pilot's door and window and the gunner's door and window are substantially instantaneously formed.

From the foregoing description, it will be perceived that a relatively simple, highly reliable emergency egress system is provided, and that such system offers certain marked advantages with respect to emergency egress systems previously proposed and in use. Although a preferred embodiment has been illustrated herein and described in detail, it is to be understood that this structure is for illustrative purposes, and is intended to be demonstrative of the basic principles which underlie the invention. For this reason, it is anticipated that changes can be made in the specifically illustrated and described structures without departure from such basic principles, and reliance upon their applicability to such modified systems. It is to be stressed, for example, that though a preferred embodiment of the invention as illustrated has included a plurality of the explosive closure cutting assemblies, explosive initiator assemblies, remote control mechanical linkages and firing handles, the invention in its most fundamental form is considered to include but a single one of each of these assemblies directly interconnected in the manner described, and without the intervention of the junction box utilized in the preferred system. The various innovations and modifications of the described system which can be effected without departure from the basic principles of the invention are deemed to be circumscribed by the spirit and scope of the invention, except as the same may be necessarily limited by the appended claims as reasonable equivalents thereof.

What is claimed is:

1. A vehicle emergency egress system comprising:
   at least one explosive cutting assembly for explosively forming an opening in the body of said vehicle;
   one explosive initiator assembly per each explosive cutting assembly, wherein each explosive initiator assembly is positioned adjacent an explosive cutting assembly for detonating said explosive cutting assembly;

at least one manually actuated firing handle;

a junction box comprising a housing and a block slidably mounted in said housing, said block having an initiator side and a handle side;

one elongated mechanical actuating linkage per each explosive initiator assembly, wherein each said linkage is connected at one of its ends to an explosive initiator and at the other of its ends to said initiator side of said block; and one elongated mechanical actuating linkage per each firing handle, wherein each said linkage is connected at one of its ends to a handle and at the other of its ends to said handle side of said block.

2. The vehicle egress system of claim 1 wherein there are at least two of said firing handles.

3. A vehicle emergency egress system, as defined in claim 2, wherein said vehicle is an aircraft.

4. An aircraft emergency egress system as defined by claim 3 wherin said explosive initiator assembly comprises:
a firing pin housing;
a firing pin slidably disposed in said firing pin housing;
an initiator body mounted on one end of said firing pin housing;
percussion primer explosive charge in said initiator body positioned to be struck and detonated by said firing pin upon sliding movement thereof in one direction in said firing pin housing;
spring means mounted in said firing pin housing and bearing against said firing pin; and
a sleeve extending slidably into said firing pin housing and releasably engaging one end of said firing pin for retracting said firing pin against said spring means as said sleeve is pulled from said firing pin housing, said sleeve being connected to one end of said remote control mechanical actuating linkage for sliding movement in said firing pin housing when said firing handle is pulled.

5. An aircraft emergency egress system as defined in claim 3
wherein said mechanical actuating linkage comprises a flexible cable including:
a flexible sheath; and
a core wire slidably mounted in said flexible sheath and having one of its ends connected to said firing handle for sliding movement in said flexible sheath when said firing handle is pulled;
and wherein said explosive initiator assembly comprises:
spring loaded firing pin means;
a sleeve releasably connected at one end to said firing pin means, and having a second end detachably connected to the other end of said core wire; and
means for automatically disengaging said sleeve from said firing pin means after said core wire has moved relative to said sheath a predetermined distance.

6. An aircraft emergency egress system as defined in claim 3
wherein said mechanical actuating linkage comprises a flexible cable including:
a flexible sheath; and
a core wire slidably mounted in said flexible sheath and having one of its ends connected to said firing handle for sliding movement in said flexible sheath when said firing handle is pulled;
and wherein said firing handle is characterized in having a "safe" position in which said handle cannot be pulled in a reciprocating movement to pull said core wire, and an "armed" position in which said handle can be pulled in a reciprocating movement to pull said core wire, and said handle is rotatable between said "safe" and "armed" positions about an axis extending parallel to the direction of the pulling movement of said handle; and
wherein said explosive initiator assembly comprises:
a firing pin releasably connected to the end of said core wire opposite its end connected to said firing handle;
a percussion primer charge positioned adjacent the firing pin in the path of movement thereof; and
housing means having the firing pin movably mounted therein for movement toward and away from the percussion primer charge, and including means facilitating detachable securement of the housing means to an aircraft with said percussion primer charge located adjacent said explosive closure cutting assembly.

7. An aircraft emergency egress system as defined in claim 3
wherein said explosive closure cutting assembly comprises:
a receptor housing adapted for securement to an aircraft and having a threaded bore in one side thereof; and
explosive booster charges mounted in said receptor housing adjacent said threaded bore; and
wherein said explosive initiator assembly comprises:
a firing pin housing having one end threaded into said threaded bore, and having an elongated bore extending thereinto from said one end;
a firing pin slidably mounted in said elongated bore; and
a percussion primer explosive mounted in said elongated bore adjacent said explosive booster charges and in the path of sliding movement of said firing pin.

8. An aircraft emergency egress system as defined in claim 3 wherein said explosive initiator assembly comprises:
a firing pin housing adapted for quick detachable securement to said explosive closure cutting assembly;
elongated bore means extending through said firing pin housing and opening adjacent said explosive closure cutting assembly;
firing pin means movably mounted in said bore means in said firing pin housing and including:
an elongated firing pin; and
a firing pin sleeve releasably connected to one end of said firing pin;
spring abutment means in said bore means intermediate the length thereof;
a firing pin spring in said bore means bearing against said spring abutment means and said firing pin means to resiliently resist movement of said firing pin away from said explosive closure cutting assembly when said firing pin housing is secured to said explosive cutting assembly;

a percussion primer explosive charge positioned in said bore means between said firing pin and said explosive cutting assembly when said firing pin housing is secured to said explosive closure cutting assembly;

a wire constituting a part of said actuating linkage and having an end connected to said sleeve for reciprocating said firing pin means in said bore means against the bias of said spring; and means for automatically releasing said sleeve from said firing pin when said firing pin means has been reciprocated to a releasing location in said elongated bore means.

9. An aircraft emergency egress system as defined in claim 8 wherein said explosive closure cutting assembly comprises:

a receptor housing adapted for securement to an aircraft and having a threaded bore in one side thereof threadedly receiving said firing pin housing; and explosive booster charges mounted in said receptor housing adjacent said percussion primer explosive charge.

10. An aircraft emergency egress system as defined in claim 8 and further characterized to include a ball secured to said wire adjacent said end thereof and removably positioned in a slot in said sleeve to detachably couple said sleeve to said wire whereby said sleeve may be independently connected to said firing pin without the connection of said wire thereto.

11. An aircraft emergency egress system as defined in claim 8 wherein said means for automatically releasing said sleeve from said firing pin comprises at least one ball positioned partly in an opening in said sleeve and partly in a groove in said firing pin, and retained in said position by rolling contact with said bore means whereby when said balls are free of confinement by said bore means, said sleeve is disengaged from said firing pin.

12. An aircraft emergency egress system as defined in claim 9 and further characterized as including a hollow initiator body detachably mounted on said firing pin housing adjacent said explosive booster charges and containing said percussion primer explosive charge.

13. An aircraft emergency egress system as defined in claim 8 wherein said firing handle is connected to a second end of said wire for pulling said wire along its longitudinal axis when said handle is pulled in one direction.

14. An aircraft emergency egress system as defined in claim 13 wherein said firing handle is characterized in having a "safe" position in which said handle cannot be pulled in said one direction, and an "armed" position in which said handle can be pulled in said one direction, and said handle is rotatable between said "safe" and "armed" positions.

15. An aircraft emergency egress system as defined in claim 8 wherein said actuating linkage is further characterized in including a flexible sheath enclosing said wire and detachably connected to said firing pin housing.

16. An aircraft emergency egress system comprising:

a plurality of spaced explosive closure cutting assemblies for explosively forming a plurality of spaced openings in the fuselage of an aircraft;

a plurality of explosive initiator assemblies each positioned adjacent one of said explosive closure cutting assemblies for detonating the respective explosive cutting assembly;

a junction box including:
a housing; and
a slide block slidably mounted in the housing;

a plurality of first elongated mechanical actuating linkages each connected at one of its ends to one of said explosive initiator assemblies and each connected at its other end to said slider block;

a plurality of spaced manually actuated firing handles; and a plurality of second elongated mechanical actuating linkages each connected at one of its ends to one of said manually actuated firing handles and at its other end to said slider block.

17. An aircraft emergency egress system as defined in claim 16 wherein each of said elongated mechanical actuating linkages comprises:

a flexible sheath; and
a wire slidable in said flexible sheath and having an end connected to said slider block.

18. An aircraft emergency egress system as defined in claim 17 wherein said slider block is further characterized in including:

a plurality of elongated ball slots in the block adjacent one side thereof and each extending toward an opposite side of the block, and a plurality of ball apertures in the block adjacent said opposite side thereof; and wherein said egress system is further characterized in including:

a ball secured to the end of each wire in each of said second mechanical actuating linkages which is connected to said slider block, each of said balls being positioned in one of said elongated ball slots at the end of the respective ball slot in which it is located which is nearest said one side of said slider block; and a ball secured to the end of each of said wires in each of said first mechanical actuating linkages which is connected to said slider block, each of said second mentioned balls being positioned in one of said ball apertures.

19. An aircraft emergency egress system as defined in claim 16 wherein said housing includes a pair of opposed, substantially parallel side walls bearing against opposite sides of said slider block and guiding the slider block in linear movement as it slides in said housing.

20. An aircraft emergency egress system comprising:

a plurality of spaced explosive closure cutting assemblies for explosively forming a plurality of spaced openings in the fuselage of an aircraft;

a plurality of explosive initiator assemblies each positioned adjacent one of said explosive closure cutting assemblies for detonating the respective explosive closure cutting assembly;

a manually actuated firing handle; and mechanical linkage means connected between said firing handle and each of said explosive initiator assemblies for mechanically simultaneously detonating said explosive initiator assemblies when said manually actuated firing handle is pulled, wherein said mechanical linkage means comprises a plurality of first wires each having one end connected to one of said explosive initiator assemblies;

a rigid block secured to the second ends of said first wires; and a second wire having one end secured to said firing handle and having a second end connected to said right block at a point on the block such that when said firing handle is pulled, said second wire is pulled in a direction to pull said first wires an equal distance with respect to said explosive initiator assemblies.

21. An aircraft emergency egress system as defined in claim 20 and further characterized as including:

a plurality of said firing handles spaced from each other; and a plurality of said second wires, each having one end attached to a different one of said firing handles and each having its second end slidably connected to said right block for sliding movement toward the points of securement of said first wires to said block when said block is pulled by pulling one of said second wires, said second wires having their end portions adjacent their second ends extending parallel to each other.

22. An aircraft emergency egress system as defined in claim 20 and further characterized as including a housing slidingly receiving said rigid block and guiding said block in reciprocating, sliding movement in said housing when any of said second wires are pulled.

* * * * *